(12) United States Patent
Chen

(10) Patent No.: US 12,235,435 B2
(45) Date of Patent: Feb. 25, 2025

(54) FOCUSING APPARATUS AND FOCUSING METHOD FOR TELESCOPE FOCUSING

(71) Applicant: Suzhou Astroasis Vision Technology Co., Ltd., Suzhou (CN)

(72) Inventor: Zhiwei Chen, Suzhou (CN)

(73) Assignee: Suzhou Astroasis Vision Technology Co., Ltd., Suzhou (CN)

( * ) Notice: Subject to any disclaimer, the term of this patent is extended or adjusted under 35 U.S.C. 154(b) by 0 days.

(21) Appl. No.: 18/694,452

(22) PCT Filed: Jul. 27, 2022

(86) PCT No.: PCT/CN2022/108207
§ 371 (c)(1),
(2) Date: Mar. 22, 2024

(87) PCT Pub. No.: WO2023/045547
PCT Pub. Date: Mar. 30, 2023

(65) Prior Publication Data
US 2024/0329385 A1 Oct. 3, 2024

(30) Foreign Application Priority Data
Sep. 24, 2021 (CN) .......................... 202111123397.X

(51) Int. Cl.
G02B 23/00 (2006.01)
G02B 7/04 (2021.01)
G02B 23/16 (2006.01)

(52) U.S. Cl.
CPC ............... *G02B 23/16* (2013.01); *G02B 7/04* (2013.01)

(58) Field of Classification Search
CPC ........ G02B 23/00; G02B 23/16; G02B 23/24; G02B 23/2476; G02B 7/00; G02B 7/004;
(Continued)

(56) References Cited

U.S. PATENT DOCUMENTS

2013/0271860 A1* 10/2013 Arakawa ................ G02B 7/105
359/823

FOREIGN PATENT DOCUMENTS

CN 103105662 A 5/2013
CN 110196479 A * 9/2019 ............... G02B 7/04
(Continued)

*Primary Examiner* — Thong Q Nguyen
(74) *Attorney, Agent, or Firm* — Bayramoglu Law Offices LLC

(57) ABSTRACT

A focusing apparatus for telescope focusing includes a to-be-focused member, an on-off limiting member and a drive fixation apparatus, where the to-be-focused member includes a first gear for focusing, the drive fixation apparatus includes a rear sleeve, a drive structure and a second gear, the rear sleeve is connected with the on-off limiting member through a limiting assembly, the drive structure is connected with the second gear, the second gear and the first gear are eccentrically arranged, and under a limiting action of the limiting assembly, the rear sleeve rotates, in relative to the on-off limiting member, between a first position and a second position on the on-off limiting member, to drive the second gear to mesh with and separate from the first gear in respective, thus the to-be-focused member is switched for electric focusing and manual focusing. The focusing apparatus is additionally provided with an on-off structure.

11 Claims, 17 Drawing Sheets

(58) Field of Classification Search
CPC .......... G02B 7/005; G02B 7/02; G02B 7/022;
G02B 7/023; G02B 7/026; G02B 7/04;
G02B 7/18; G02B 7/1824; G02B 7/1827
USPC ............... 359/368, 383, 399, 405, 407, 410,
359/425–426, 694–706
See application file for complete search history.

(56) References Cited

FOREIGN PATENT DOCUMENTS

| | | | | | |
|---|---|---|---|---|---|
| CN | 110376702 | A | | 10/2019 | |
| CN | 110737067 | A | * | 1/2020 | ................ G01J 5/08 |
| CN | 211043802 | U | | 7/2020 | |
| CN | 113625418 | A | | 11/2021 | |
| JP | 2006259130 | A | | 9/2006 | |
| JP | 2008058914 | A | | 3/2008 | |
| JP | 2013083775 | A | | 5/2013 | |
| JP | 6758847 | B2 | * | 9/2020 | |

* cited by examiner

FOCUSING APPARATUS AND FOCUSING METHOD FOR TELESCOPE FOCUSING

CROSS REFERENCE TO THE RELATED APPLICATIONS

This application is the national phase entry of International Application No. PCT/CN2022/108207, filed on Jul. 27, 2022, which is based upon and claims priority to Chinese Patent Application No. 202111123397.X, filed on Sep. 24, 2021, the entire contents of which are incorporated herein by reference.

TECHNICAL FIELD

The present application belongs to the technical field of telescope focusing, and particularly relates to a focusing apparatus and a focusing method through which an automatic focusing mode and a manual focusing mode may be switched easily.

BACKGROUND

For photographing, a lens will converge light and finally present a clear image on a negative film or an image sensor, and the presented image will be fuzzy and unclear if the position of the negative film or the image sensor is not on a light converging focus. But in an actual application, this focus usually has one theoretical position only, the actual real position is often difficult to measure, so we need to adjust the position of the negative film continuously to make the image achieve the clearest effect, and this process is called focusing or combined focusing.

Traditionally, the focusing is usually completed by a mode for manually controlling a mechanical structure and watching a detection effect. However, since manual control is not sensitive to very subtle adjustments, electric focusing is introduced later. Usually, the electric focusing is used in combination with the image sensor, different people master different final focuses when watching the focusing due to differences in the structures of human eyes, therefore combined with the image sensor, a definition of a target is automatically judged by software, and a result is fed back to an electric focuser, and then the clearest imaging is achieved through repeated adjustments.

Usually, a device equipped with the electric focuser is difficult to perform focusing by the mode for manually controlling the mechanical structure again, because after being mounted, the electric focusing is connected together with the part for manually controlling the mechanical structure, a forced manual rotation will damage the electric focusing, and moreover a huge reduction ratio exists between internal gears, which will also lead to difficulties in rotation. However, focusing by manually controlling the mechanical structure also has an irreplaceable role, for example, under the condition that the use of the device is completed and a system has been in power failure, if a telescope needs to be stored, a focusing structure needs to be adjusted at this time to make the telescope be shortened, for ease of storage. In addition to this, the focusing structures of most telescopes are symmetrical in left and right, the manual focusing structure on the other side still exists after the electric focusing is mounted on one side, so some users get used to using the manual focusing first to adjust the telescope near the focus, and then using an electric focusing mode to complete focusing quickly.

At the same time, the device wireless trend is also more and more obvious currently, wireless control has always been a strong demand for astrophotography, and due to harsh requirements of the astrophotography on a photographing environment, the photographing environment of the astrophotography must be dark enough. Therefore, usual photographing places are unfrequented places at night, and these places not only have poor photographing experience, but also are not guaranteed in safety. After the wireless, photographers may perform photographing in such a comfortable and safe place such as their own tents or cars.

In conclusion, the focusing device for the current lens generally has the following defects: 1. After the electric focuser is mounted, the original manual focusing knob is out of work; 2. After the manual focusing knob is out of work, if the telescope needs to perform the focusing control in some occasions without electricity, the electric focuser can be removed only, which is troublesome and inconvenient; and 3. The lack of the wireless control causes that the photographers must be aside the machine during photographing, leading to a poor photographing experience.

SUMMARY

The main objective of this application is to provide a focusing apparatus and a focusing method for telescope focusing through which an automatic focusing mode and a manual focusing mode may be switched easily, thereby overcoming the deficiencies in the prior art.

To implement the objective of the foregoing application, the technical solution adopted by the present application includes:

Embodiments of the present application provide a focusing apparatus for telescope focusing, including:
 a to-be-focused member, which includes a first gear for focusing;
 an electric focusing apparatus, which includes:
 an on-off limiting member fixedly connected with the to-be-focused member,
 a drive fixation apparatus, which includes a rear sleeve, a drive structure and a second gear, where the rear sleeve is connected with the on-off limiting member through a limiting assembly, the drive structure is fixed in the rear sleeve and connected with the second gear, the second gear and the first gear are eccentrically arranged, and under a limiting action of the limiting assembly, the rear sleeve rotates, in relative to the on-off limiting member, between a first position and a second position on the on-off limiting member; and
 when the rear sleeve rotates to the first position, the second gear meshes with the first gear, the drive structure drives the first gear to rotate through the second gear, the to-be-focused member is electrically focused, and the rear sleeve is also locked and fixed to the on-off limiting member through a locking structure, to maintain a meshing state of the second gear and the first gear; and when the rear sleeve rotates to the second position, the second gear is separated from the first gear, and the to-be-focused member enters a manual focusing mode.

Embodiments of the present application further provide a focusing method for telescope focusing, including:
 S100, fixedly connecting an electric focusing apparatus with a to-be-focused member; and
 S200, rotating a rear sleeve to a first position, meshing a second gear with a first gear, driving, by a drive structure, the first gear to rotate through the second gear, and electrically focusing the to-be-focused member; or rotating a rear sleeve to a second position, separating a second gear from a first gear, and the to-be-focused member entering a manual focusing mode.

Compared with the prior art, the beneficial effects of the present application at least lie in:

1) The focusing apparatus for telescope focusing provided by embodiments of the present application has the on-off structure, and the electric focusing apparatus may be disconnected with the to-be-focused member through the on-off structure, for ease of users' manual focusing. If the electric focusing is required, it only needs to connect the electric focusing apparatus with the to-be-focused member again through the on-off structure, which is very convenient to operate and easy to switch different focusing modes of the to-be-focused member;
2) The focusing apparatus for telescope focusing provided by embodiments of the present application has a wireless bluetooth function, and this apparatus may be connected and controlled through a mobile phone and other mobile devices for focusing, with convenient use;
3) The focusing apparatus for telescope focusing provided by embodiments of the present application may be fixedly connected with the to-be-focused member through a hoop, and this installation mode is very convenient;
4) The focusing apparatus for telescope focusing provided by embodiments of the present application is also provided with an elastic damping member between the rear sleeve and the on-off limiting member, which is used for increasing a frictional force between a locating pin and a sliding slot of the on-off limiting member to prevent the on-off limiting member and the rear sleeve from loosening when the drive structure runs, thereby ensuring a focusing precision, and reducing a return difference during focusing;
5) The focusing apparatus for telescope focusing provided by embodiments of the present application also locks and fixes the rear sleeve and the on-off limiting member through the locking structure when the rear sleeve rotates to the first position, to maintain the meshing state of the second gear and the first gear and ensure a meshing degree of the gears; and
6) The focusing apparatus for telescope focusing provided by embodiments of the present application integrates the drive structure, the drive apparatus and the like in the rear sleeve, and the electric focusing apparatus is integrally set to a cylindrical shape, with a high level of integration, a small volume, concision, beautiful appearance and convenient installation and use.

BRIEF DESCRIPTION OF THE DRAWINGS

To better clarify the embodiments of the present application or the technical solution in the prior art, the drawings required to illustrate the embodiments or the prior art will be simply described below. It is apparent that the drawings described below are merely some embodiments recorded in the present application. Those ordinarily skilled in the art can obtain other drawings according to these drawings without contributing creative labor on the basis of those drawings.

Figure 1:
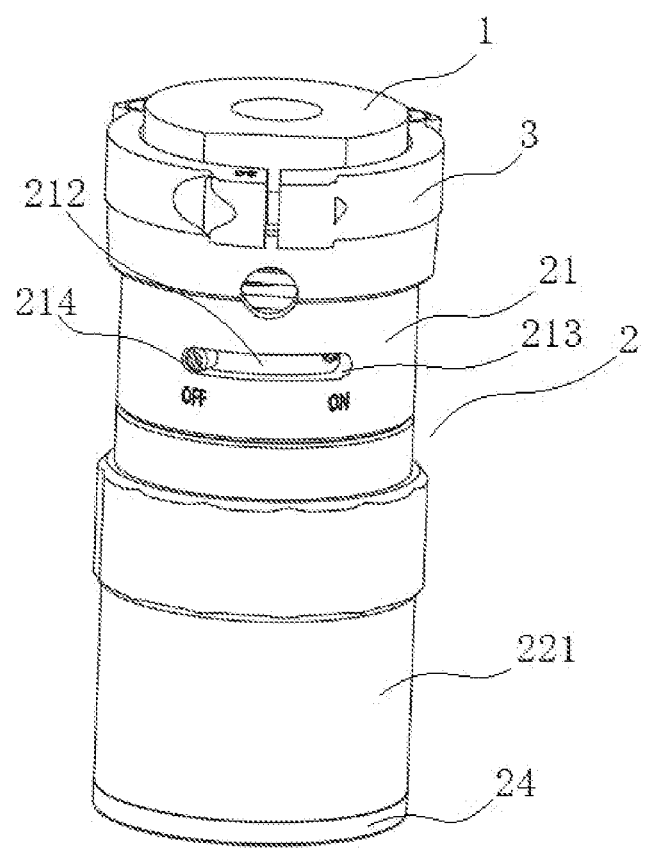
FIG. 1 is a solid structure diagram of a focusing apparatus for telescope focusing provided by a typical embodiment of the present application.
Figure 2:
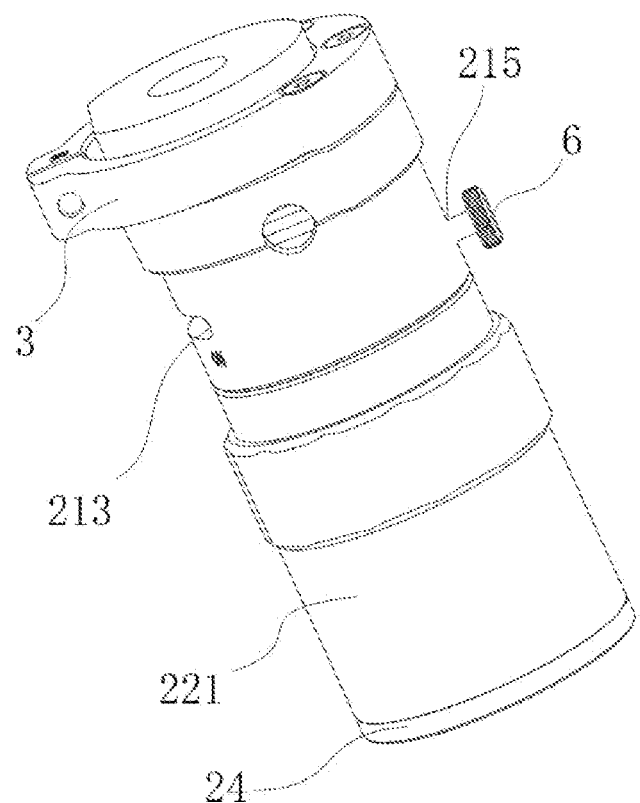
FIG. 2 is a solid structure diagram of a focusing apparatus for telescope focusing provided by a typical embodiment of the present application.
Figure 3A:
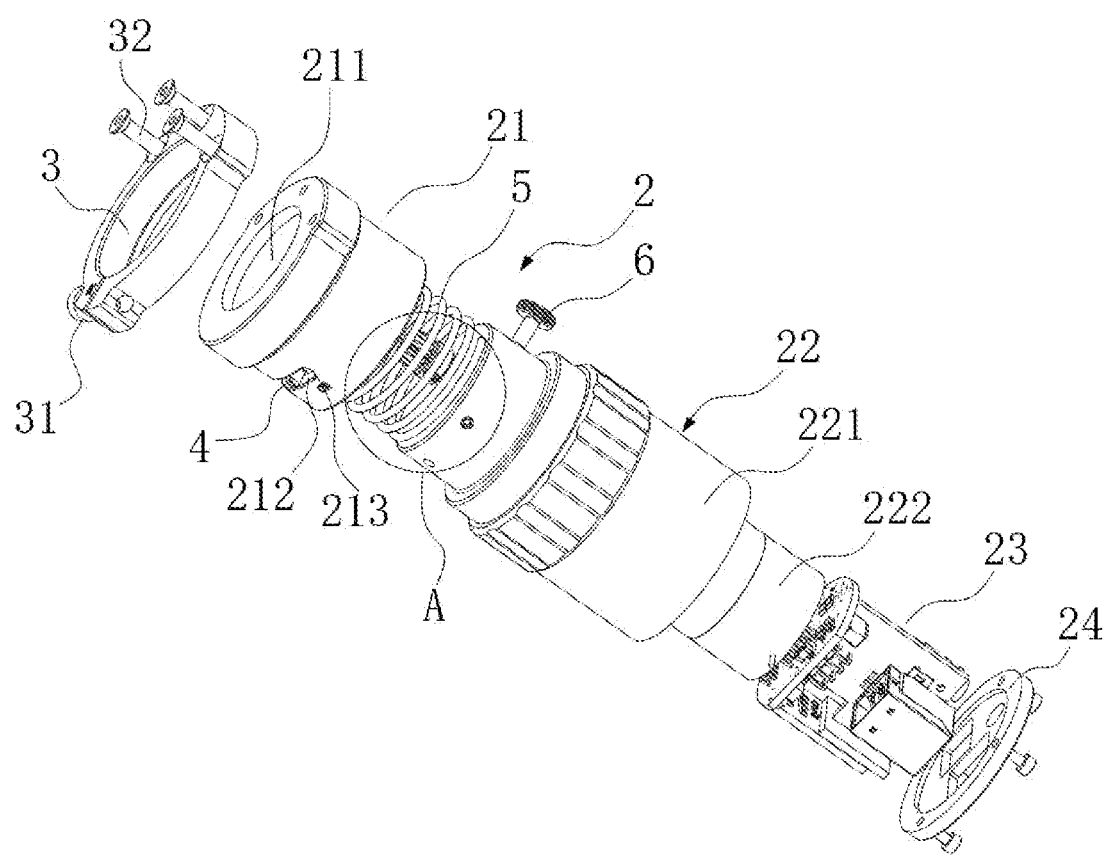
FIG. 3A is a split structure diagram of a focusing apparatus for telescope focusing provided by a typical embodiment of the present application.
Figure 3B:
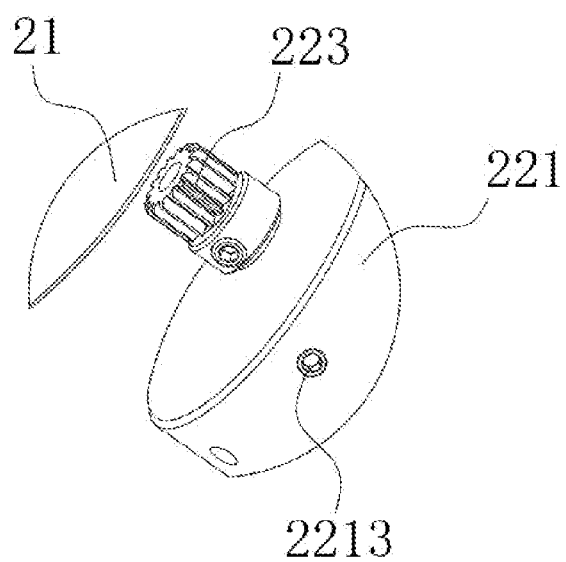
FIG. 3B is a diagram of an enlarged structure of a part A (except an elastic damping member) in FIG. 3A.
Figure 4A:
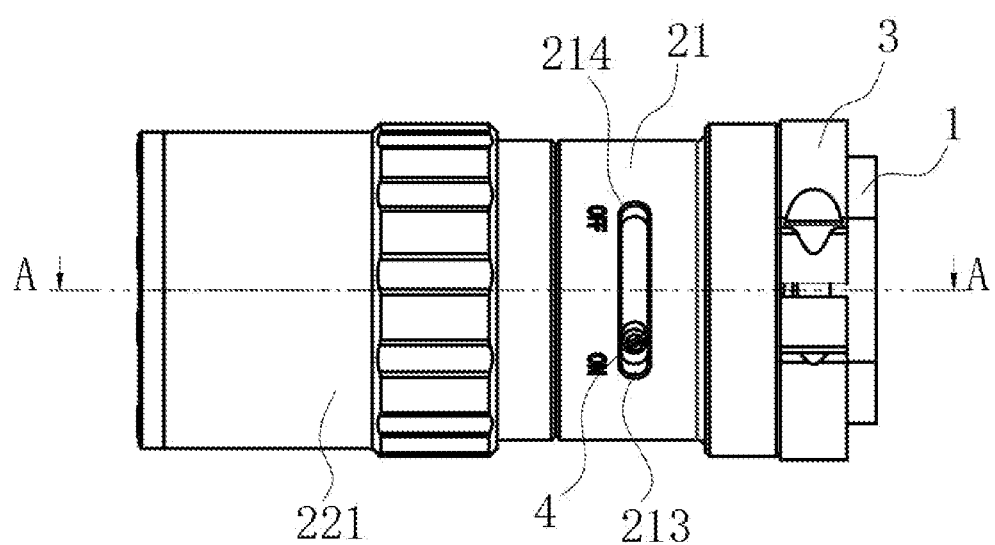
FIG. 4A is a section structure diagram of a focusing apparatus for telescope focusing provided by a typical embodiment of the present application.
Figure 4B:
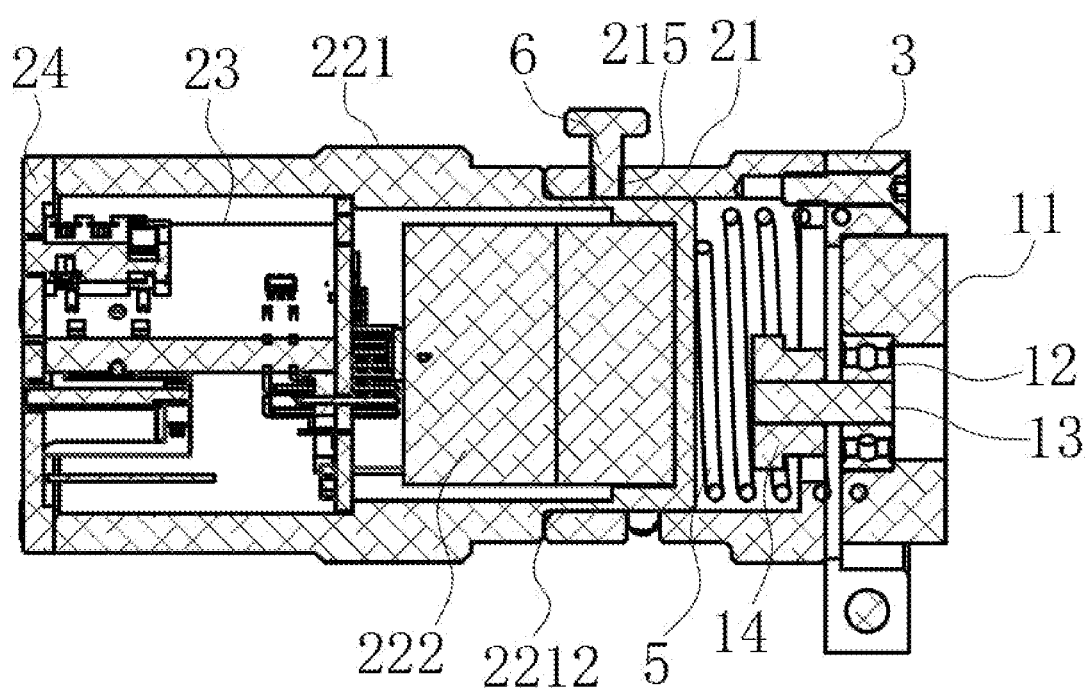
FIG. 4B is a section structure diagram of FIG. 4A in an A-A direction.
Figure 4C:
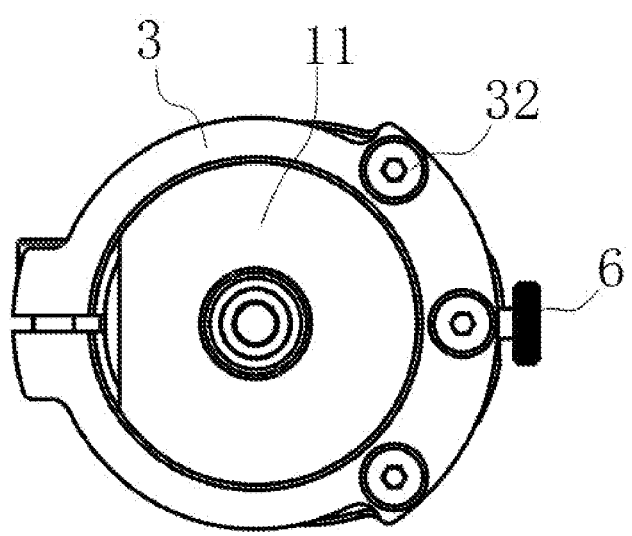
FIG. 4C is a look-down structure diagram of FIG. 4A.

Reference signs: 1—to-be-focused member, 11—focusing base, 12—rotating bearing, 13—output rotating shaft, 14—first gear, 2—electric focusing apparatus, 21—on-off limiting member, 211—hole, 212—sliding slot, 213—first position, 214—second position, 215—thumb threaded hole, 22—drive fixation apparatus, 221—rear sleeve, 2211—output hole, 2212—blocking step, 2213—fixing hole, 222—drive structure, 223—second gear, 23—drive apparatus, 231—main control chip, 232—motor drive chip, 233—bluetooth module, 234—USB (Universal Serial Bus) socket, 24—rear cover, 3—hoop, 31—holding screw, 32—screw, 4—locating pin, 5—elastic damping member, 6—thumb screw.

DETAILED DESCRIPTION OF THE EMBODIMENTS

In view of deficiencies in the prior art, the inventor of this case proposes the technical solution of the present application through long-term research and a lot of practice. This technical solution, its implementation process and principle and the like are further explained below in combination with drawings and specific embodiments.

Embodiments of the present application provide a focusing apparatus for telescope focusing, including:

a to-be-focused member, which includes a first gear for focusing;

an electric focusing apparatus, which includes:
an on-off limiting member fixedly connected with the to-be-focused member,
a drive fixation apparatus, which includes a rear sleeve, a drive structure and a second gear, where the rear sleeve is connected with the on-off limiting member through a limiting assembly, the drive structure is fixed in the rear sleeve and connected with the second gear, the second gear and the first gear are eccentrically arranged, and under a limiting action of the limiting assembly, the rear sleeve rotates, in relative to the on-off limiting member, between a first position and a second position on the on-off limiting member; and
when the rear sleeve rotates to the first position, the second gear meshes with the first gear, the drive structure drives the first gear to rotate through the second gear, the to-be-focused member is electrically focused, and the rear sleeve is also locked and fixed to the on-off limiting member through a locking structure, to maintain a meshing state of the second gear and the first gear; and when the rear sleeve rotates to the second position, the second gear is separated from the first gear, and the to-be-focused member enters a manual focusing mode.

In a preferred embodiment, the limiting assembly includes a sliding slot and a locating pin fitting with the sliding slot, the sliding slot is formed in the on-off limiting member and extends circumferentially along a center of the on-off limiting member, and two tail ends of the sliding slot are separately formed with the first position and the second position; and the locating pin is limited in the sliding slot and fixedly connected with the rear sleeve.

In a preferred embodiment, an elastic damping member for increasing a frictional force between the locating pin and the on-off limiting member is also arranged between a front end face of the rear sleeve and a front end face of the on-off limiting member.

In a preferred embodiment, the apparatus further includes a drive apparatus electrically connected with the drive structure, the drive apparatus is arranged in the rear sleeve and includes one or more integrated circuit boards, each circuit board includes a motor drive chip, a main control chip and an USB socket, the motor drive chip is electrically connected with the drive structure, and the main control chip is connected with both the motor drive chip and the USB socket.

In a preferred embodiment, the circuit board further includes a bluetooth module, and the main control chip is connected with the bluetooth module.

In a preferred embodiment, the electric focusing apparatus is fixedly connected with the to-be-focused member through a hoop.

In a preferred embodiment, when rotating to the first position, the rear sleeve is locked and fixed to the on-off limiting member through the locking structure, to maintain the meshing state of the second gear and the first gear.

In a preferred embodiment, an outer side of the rear sleeve is formed with a blocking step and a fixing hole, when an end face of the on-off limiting member is propped with the blocking step, the fixing hole is located below the sliding slot, and the locating pin passes through the sliding slot and is locked in the fixing hole.

Embodiments of the present application further provide a focusing method for telescope focusing, including:
S100, fixedly connecting an electric focusing apparatus with a to-be-focused member; and
S200, rotating a rear sleeve to a first position, meshing a second gear with a first gear, driving, by a drive structure, the first gear to rotate through the second gear, and electrically focusing the to-be-focused member; or rotating a rear sleeve to a second position, separating a second gear from a first gear, and the to-be-focused member entering a manual focusing mode.

In a preferred embodiment, the S200 includes:
rotating the rear sleeve, driving the locating pin to slide along a direction that the sliding slot is close to the first position, meanwhile driving a second gear in the rear sleeve to move along a direction close to a first gear, when the locating pin slides to the first position of the sliding slot, meshing the second gear with the first gear, driving, by a drive structure connected with the second gear, the second gear to rotate, driving the first gear to rotate while rotating, and performing electric focusing on the to-be-focused member;
or, rotating the rear sleeve, driving the locating pin to slide along a direction that the sliding slot is close to the second position, meanwhile driving a second gear in the rear sleeve to move along a direction away from a first gear, when the locating pin slides to the second position of the sliding slot, separating the second gear from the first gear, the to-be-focused member entering a manual focusing mode.

In a preferred embodiment, the S100 includes:
fixedly connecting the electric focusing apparatus with a hoop;
holding the hoop on the to-be-focused member; and
locking the hoop, and fixedly connecting the electric focusing apparatus with the to-be-focused member.

The present application will be understood more completely below by reading the following specific implementations together with the attached drawings. The detailed embodiments of the present application are disclosed herein; and however the the disclosed embodiments only have the demonstration of the present application, and the present application may be reflected in various forms. Hence, the specific functions and details disclosed herein should not be understood as restrictive instead of only interpreting as the basis of claims and interpreting as the representative basis for teaching those skilled in the art to adopt the present application in different modes in any suitable detailed embodiment in fact.

Embodiment 1

As shown in FIG. 1-FIG. 2, FIG. 3A-FIG. 3B and FIG. 4A-FIG. 4C, embodiments of the present application provide a focusing apparatus for telescope focusing, which is mainly used for switching an electric focusing mode and a manual focusing mode of a telescope and mainly includes a to-be-focused member 1 and an electric focusing apparatus 2, the electric focusing apparatus 2 is connected with the to-be-focused member 1 to switch an electric focusing mode and a manual focusing mode of the to-be-focused member 1, and when the to-be-focused member 1 is adjusted to the electric focusing mode, the to-be-focused member 1 is subjected to electric focusing.

Figure 5:
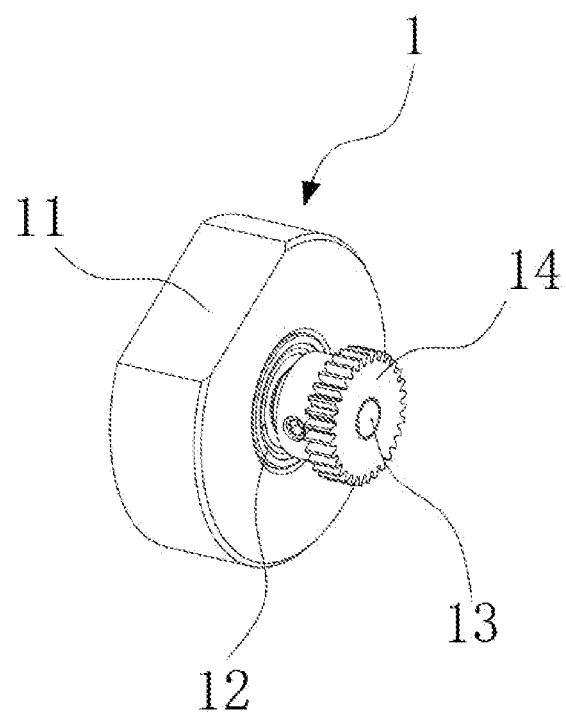
FIG. 5 is a structure diagram of a to-be-focused member.

In this embodiment, the to-be-focused member 1 is but not limited to the telescope, as shown in FIG. 5, the telescope includes a focusing base 11, a rotating bearing 12, an output rotating shaft 13 and a first gear 14, where the rotating bearing 12 is arranged in the focusing base 11, the output rotating shaft 13 is rotationally connected with the rotating bearing 12, the first gear 14 is fixed to the output rotating shaft 13.

In this embodiment, the first gear 14 is fixedly connected with the output rotating shaft 13 through a top thread (not shown in the drawings). The first gear 14 drives the output rotating shaft 13 to rotate while rotating, so as to focus the telescope.

In this embodiment, the whole electric focusing apparatus 2 is fixedly connected with the focusing base 11, as shown in FIG. 1-FIG. 2, FIG. 3A-FIG. 3B and FIG. 4A-FIG. 4C, in this embodiment, the electric focusing apparatus 2 is specifically connected with the focusing base 11 fixedly through a hoop 3, specifically the hoop 3 is held on the focusing base 11 of the telescope and a holding screw 31 of the hoop is locked, such that the electric focusing apparatus 2 is assembled on the focusing base 11 of the telescope, and this installation mode is very convenient.

In this embodiment, a diameter of the hoop 3 is optional, and the corresponding hoop 3 is selected to connect the electric focusing apparatus 2 according to the diameter of the focusing base 11 of the telescope, so as to adapt to the telescope focusing base 11 of different sizes.

In combination with what is shown in FIG. 3A-FIG. 3B and FIG. 4A-FIG. 4C, the electric focusing apparatus 2 specifically includes an on-off limiting member 21, a drive fixation apparatus 22, a drive apparatus 23 and a rear cover 24, where the on-off limiting member 21 is fixedly connected with the hoop 3.

Figure 7:
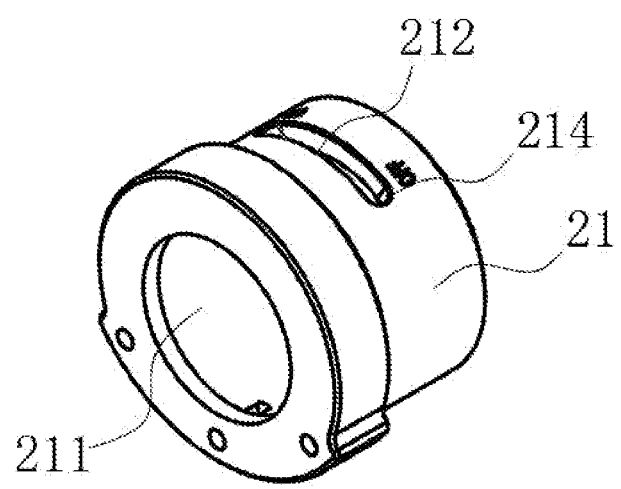
FIG. 7 is a solid structure diagram of an on-off limiting member provided by a typical embodiment of the present application.

In this embodiment, as shown in FIG. 7, the on-off limiting member 21 is a cylindrical structure with a hollow interior, a front end face thereof is a semi-closed structure and a middle thereof is provided with a hole 211, and a diameter of the hole 211 is less than that of the hollow interior. The front end face of the on-off limiting member 21 is fixedly connected with the hoop 3, and specifically the front end face of the on-off limiting member 21 is fixedly connected with the hoop 3 through a screw 32. The on-off limiting member 21 is also provided with a limiting slot 212 that extends circumferentially along a center of the on-off limiting member 21 to form a section of circular arc slot, both ends of the sliding slot 212 are separately defined as a first position 213 and a second position 214 and accordingly provided with indicating bits, and specifically the first position 213 is an ON indicating bit and the second position 214 is an OFF indicating bit.

Figure 6A:
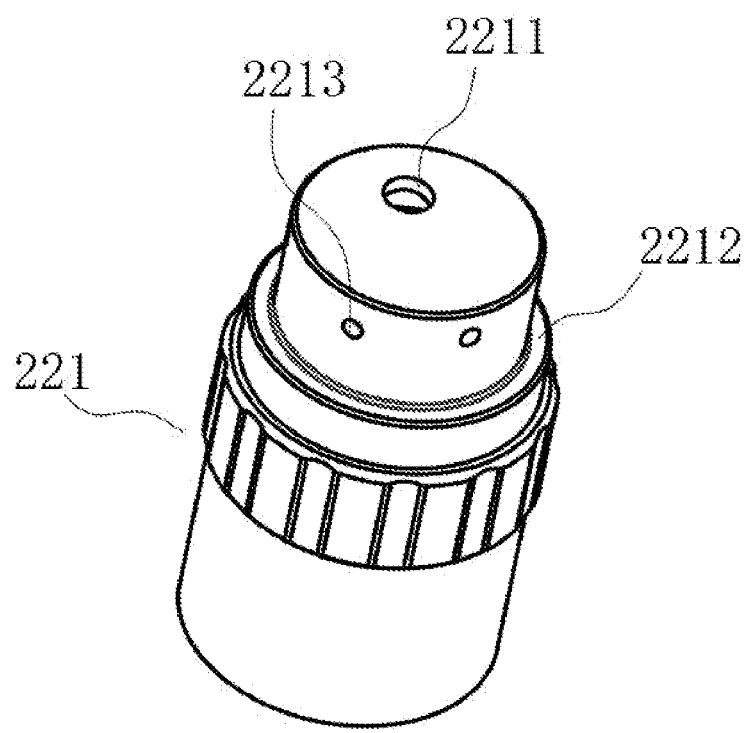
FIG. 6A and FIG. 6B are solid structure diagrams of a rear sleeve at different perspectives in a typical embodiment of the present application.
Figure 6B:
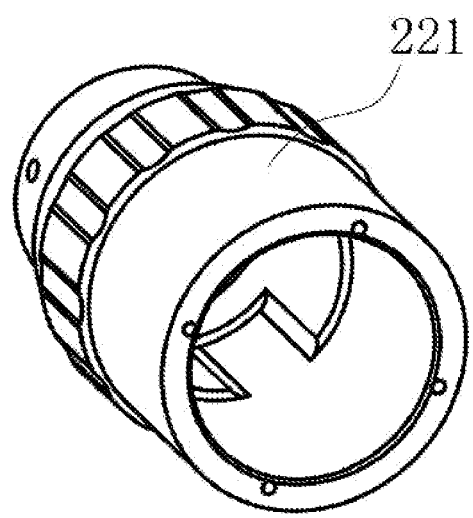

In combination with what is shown in FIG. 3A-FIG. 3B and FIG. 4A-FIG. 4C, the drive fixation apparatus 22 is connected with the on-off limiting member 21 and specifically includes a rear sleeve 221, a drive structure 222 and a second gear 223, where as shown in FIG. 6A and FIG. 6B, the rear sleeve 221 is similarly a cylindrical structure with a hollow interior, a front end face thereof is a closed plane, and an output hole 2211 is formed in the rear sleeve 221 and set in a form of deviating from the plane. An outer surface of the rear sleeve 221 is formed with a blocking step 2212 and at least one fixing hole 2213, and the blocking step 2212 is formed in a manner that a diameter of a rear end of the rear sleeve 221 is greater than that of a front end thereof.

In this embodiment, when the rear sleeve 221 is assembled with the on-off limiting member 21, a first half part thereof stretches into the on-off limiting member 21 until a rear end face of the on-off limiting member 21 is propped with the blocking step 2212, at this time the fixing hole 2213 in the rear sleeve 221 is just located below the sliding slot 212 of the on-off limiting member 21, and a locating pin 4 passes through the sliding slot 212 of the on-off limiting member 21 and the fixing hole 2213 in the rear sleeve 221 sequentially, thus the rear sleeve 221 is connected with the on-off limiting member 21.

It may be understood that, in this embodiment, the rear sleeve 221 is slidingly connected with the on-off limiting member 21 through the locating pin 4 and the sliding slot 212 that fit with each other, and the locating pin 4 and the sliding slot 212 herein constitute a limiting assembly; and in other embodiments, the sliding connection of the rear sleeve 221 and the on-off limiting member 21 is not limited to a fitting structure of the locating pin 4 and the sliding slot 212 herein. After the rear sleeve 221 is slidingly connected with the on-off limiting member 21, the rear sleeve 221 may be rotated in a clockwise or anticlockwise direction, to drive the locating pin 4 to move in the sliding slot 212.

It is to be noted that the size and the position of the sliding slot 212 of the on-off limiting member 21 as well as the position of the locating pin 4 may be determined through the center position of the first gear 14, the center position of the on-off limiting member 21 (or the rear sleeve 221), the sizes of the first gear 14 and the second gear 223 and other mutual relations, such that when the locating pin 4 is closed to the ON indicating bit, the electric focusing apparatus 2 is in a state of being meshed or nearly meshed, and when the locating pin 4 is close to the OFF indicating bit, the electric focusing apparatus 2 is in a state of being separated or nearly separated. Specifically, positions of the first gear 14 and the second gear 223 may be determined through pitch diameters and tip diameters of the gears; and > when the two gears mesh with each other correctly, pitches of the two gears are tangent, and at this time it may be roughly judged that the locating pin 4 is at a position where the limiting slot is close to one end of the ON indicating bit; and conversely, when the two gears are separated from each other, a central distance of the two gears is greater than the sum of the top radiuses of the two gears, and at this time it may be roughly judged that the locating pin is at a position where the limiting slot is close to one end of the OFF indicating bit.

In this embodiment, since the position of the first gear 14 is located on a central shaft of the overall structure while the second gear 223 takes a central shaft of the first gear 14 as a rotating shaft and rotates around the first gear 14, the position of the second gear 223 on the rear sleeve 221 may be determined in combination with the above position relationship of the two gears.

In this embodiment, the drive structure 222 is mounted in the rear sleeve 221 and the drive structure 222 is a motor with a reducer, the motor is tightly close to the front end face of the rear sleeve 221, at the same time an output shaft of the motor stretches out of the output hole 2211 in the front end face of the rear sleeve 221, and this output hole 2211 determines the position that the output shaft of the motor is on the rear sleeve 221. The second gear 223 is fixedly connected with the output shaft of the motor, and specifically the second gear 223 is fixedly connected with the output shaft of the motor through a top thread.

In addition, the motor and the rear sleeve 221 may also be fixed in a manner that the top thread passes through the side of the rear sleeve 221 to prop with the motor surface.

In this embodiment, after the on-off limiting member 21 is fixed to the telescope focusing base 11 through the hoop 3 and the rear sleeve 221 is slidingly connected with the on-off limiting member 21, the second gear 223 and the first gear 14 are eccentrically arranged.

In this embodiment, the center of the first gear 14 is fixedly arranged, while the center of the on-off limiting member 21 or the center of the rear sleeve 221 is not on a same shaft with the center of the first gear 14. When the rear sleeve 221 is rotated clockwise or anticlockwise, the second gear 223 makes a circular motion around the center of the on-off limiting member 21 or the rear sleeve 221, and since the center of the circular motion is not on a same shaft with the center of the second gear 223, the second may 223 may move in a direction that is close to or away from the first gear 14, thereby achieving the purpose of meshing or separating the two gears.

Figure 9A:
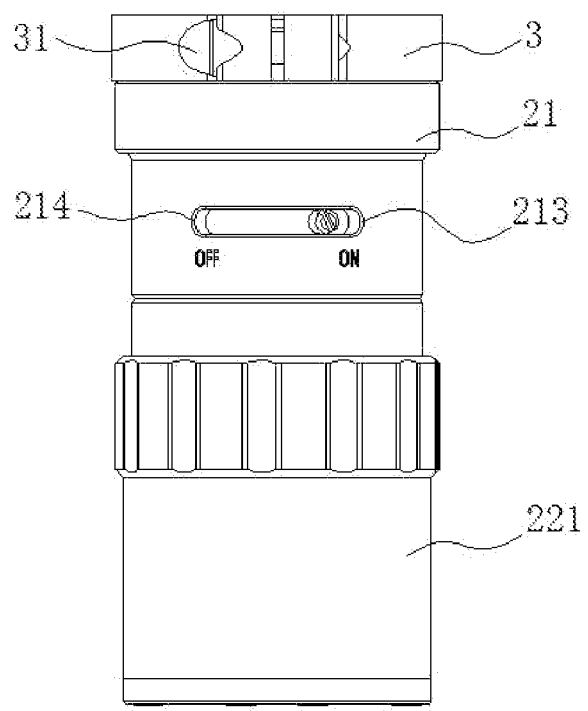
FIG. 9A is a front view structure diagram of a focusing apparatus for telescope focusing in an ON state provided by a typical embodiment of the present application.
Figure 9B:
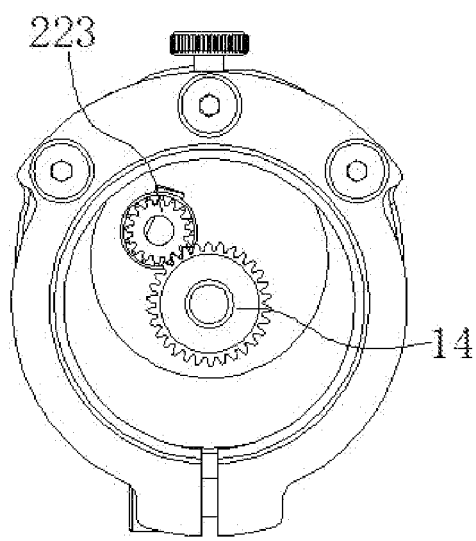
FIG. 9B is a look-down structure diagram of a focusing apparatus for telescope focusing in an ON state provided by a typical embodiment of the present application.
Figure 10A:
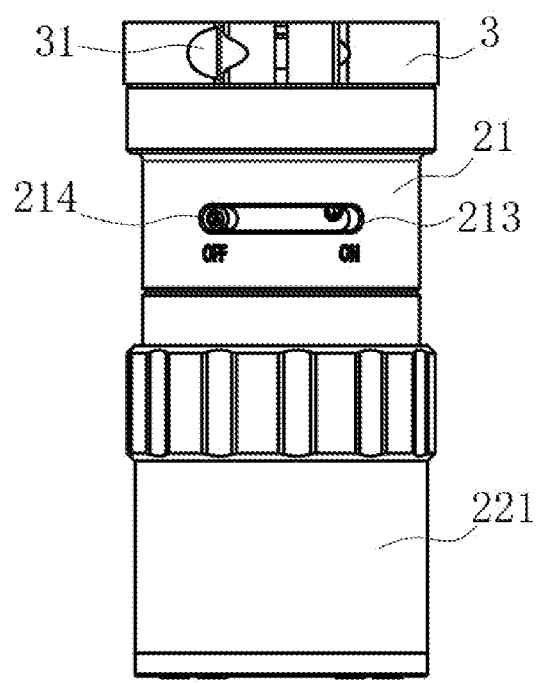
FIG. 10A is a front view structure diagram of a focusing apparatus for telescope focusing in an OFF state provided by a typical embodiment of the present application.
Figure 10B:
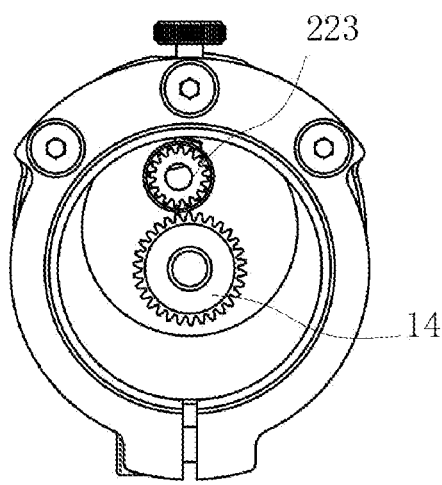
FIG. 10B is a look-down structure diagram of a focusing apparatus in an OFF state provided by a typical embodiment of the present application.

In combination with what is shown in FIG. 9A and FIG. 9B, in this embodiment, when the locating pin 4 is close to the first position 213 (that is, the ON end) by rotating the rear sleeve 221, the second gear 223 moves to the direction that is close to the first gear 14 simultaneously until the second gear 223 and the first gear 14 reach or are about to reach the meshing state when the locating pin 4 reaches the first position 213, and at this time the telescope enters the electric focusing mode. On the contrary, in combination with what is shown in FIG. 10A and FIG. 10B, when the locating pin 4 is close to the second position 214 (that is, the OFF end) by rotating the rear sleeve 221, the second gear 223 moves to the direction that is away from the first gear 14 simultaneously until the second gear 223 and the first gear 14 reach or are about to reach the separating state when the locating pin 4 reaches the second position 214, at this time the telescope enters the manual focusing mode, and manual focusing may be performed by manually screwing a focusing handwheel (not shown in drawings) of the telescope, thus the telescope is compatible with two focusing operation modes.

In this embodiment, an elastic damping member 5 for increasing a frictional force between the locating pin 4 and the on-off limiting member 21 is also arranged between a front end face of the rear sleeve 221 and a front end face of the on-off limiting member 21; in this embodiment, since the first half part of the rear sleeve is located in the on-off limiting member 21, the elastic damping member 5 is located in the on-off limiting member 21 and compressed by the on-off limiting member 21 and the rear sleeve 221, and thus making the rear sleeve 221 have a force to go backwards; and the rear sleeve 221 does not exit from the on-off limiting member 21 due to the blockage of the locating pin 4.

In this embodiment, the objective of the elastic damping member 5 is mainly to increase the frictional force between the locating pin 4 and the on-off limiting member 21, that is, to increase the connecting firmness of the on-off limiting member 21 and the rear sleeve 24, making the rear sleeve 221 be rotated by hand twisting in the on-off limiting member 21 and not loosen at will when the hand stops the rotation or focuses due to the existence of the frictional force, thus when in an OFF or ON state, the electric focusing apparatus 2 may be in a stable state, to guarantee a focusing precision and reduce a return difference during focusing, and in specific implementation, the elastic damping member 5 may be a spring, etc.

In this embodiment, an outer side of the on-off limiting member 21 is also provided with a thumb threaded hole 215, and a thumb screw 6 may be propped with the rear sleeve 221 through the thumb threaded hole 215, such that the on-off limiting member 21 and the rear sleeve 221 are fixed; and when the electric focusing apparatus 2 is in an ON position and long-time use of the electric focusing apparatus 2 is required, users may select to tighten the thumb screw 6, to ensure that the electric focusing apparatus 2 is always in the ON state. Usually, tightening the screw is not required during use.

In this embodiment, the drive apparatus 23 is also mounted in the rear sleeve 221 and specifically mounted at a rear end part of the rear sleeve 221, the drive apparatus 23 is electrically connected with the motor, and specifically the drive apparatus 23 is electrically connected with the motor through an electric wire, which is mainly used for providing a driving force in the electric focusing mode to complete focusing, and the rear cover 24 is used for fixing the drive apparatus 23 and also used for sealing the rear end face of the rear sleeve 221.

In this embodiment, the drive apparatus 23 is an integrated circuit board and specifically formed by integrating one or more circuit boards, and due to a narrow interior space of the rear sleeve 221, the mode of using the integrated circuit board may make full use of the space of the rear sleeve 221, and reduce the overall size as far as possible.

Figure 8:
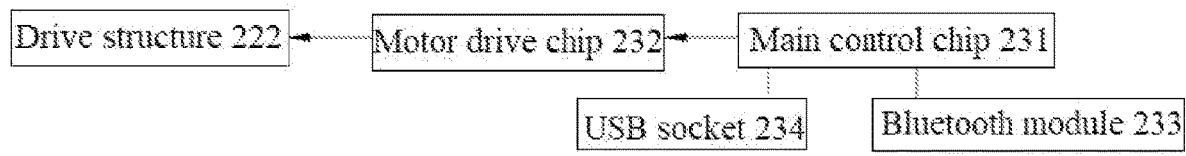
FIG. 8 is a structure block diagram of a drive apparatus provided by a typical embodiment of the present application.

As shown in FIG. 8, the integrated circuit board includes a main control chip 231, a motor drive chip 232, a bluetooth module 233, a USB socket 234 and other auxiliary electronic components (such as a button, not shown, and the button is mainly used for performing some necessary operations, such as, turn on the bluetooth, etc.), where the motor drive chip 232 is connected with the motor through the electric wire, which is mainly used for controlling the rotating angle of the motor and ensuring a mechanical structure part of the lens to move to a correct position, the motor drive chip 232 is connected with the main control chip 231, and electric signal connections are available both between the main control chip 231 and the USB socket 234 and between the main control chip 231 and the bluetooth module 233.

In this embodiment, the rear cover 24 is provided with a gap (not shown in drawings), to expose the USB socket 234. Connecting the USB socket 234 with a USB interface of a PC (Personal Computer) machine or other devices by using a USB data wire may implement data transmission between the electric focusing apparatus 2 and the PC machine and other devices, and thus the focusing function of the electric focusing apparatus 2 is used through the PC machine or other devices.

In this embodiment, the main control chip 231 may adopt Arm or a singlechip or another chip with a similar function for implementation, which is mainly used for completing the reception of control commands sent by the bluetooth module 233 or the USB socket 234, and operating the motor drive chip 232.

In this embodiment, the bluetooth module 233 is added in the present application, the main control chip 231 receives and sends the control commands from the USB socket 234 or the bluetooth module 233, and sends the commands to the motor control chip 232; and the motor control chip 232 controls the motor to rotate, and then drives the mechanical structure part of the telescope lens, to complete the focusing operation.

When working in a bluetooth mode, connection with the devices with bluetooth functions, such as a mobile phone and a laptop, is implemented without requiring other connecting wires, thus the electric focusing apparatus may be directly controlled on these devices, and control may be performed in a more comfortable and safer place, but the electric focusing apparatus 2 still keeps the mode that the computer is directly connected by USB for control, which is mainly used for being compatible with the past focusing mode.

After the focusing apparatus for telescope focusing provided by embodiments of the present application is added with the bluetooth module 233, three control modes may be provided, which are wired control independently using USB, wireless control independently using bluetooth and wireless control performed by using the USB wireless control and bluetooth at the same time.

In addition, the on-off structure is added before the motor in the present application, and the electric focusing apparatus may be disconnected with the telescope through the on-off structure, for ease of users' manual focusing. If the electric focusing is required, connection is only needed to be performed again through the on-off structure. The switch of the electric control mode and the manual control mode may be easily completed without requiring other devices.

In addition, both the on-off limiting member 21 and the rear sleeve 221 in the present application are cylindrical, making the overall appearance of the present application be cylindrical, small in volume, simple and beautiful. Moreover, the electric focusing apparatus 2 in the present application is highly integrated, and both the motor and the drive apparatus 23 are integrated in a very small volume, with very convenient installation and use.

During specific installation, other parts are assembled into one except the first gear 14, that is, the electric focusing apparatus 2 is assembled integrally, then the hoop 3 is held on the telescope focusing base 11, and then the holding screw 31 of the hoop 3 is locked, thus the electric focusing apparatus 2 is assembled to the telescope focusing base 11.

During specific use, one hand holds the on-off limiting member 21 of the electric focusing apparatus 2 or the telescope, the other hand holds the rear sleeve 221 and rotates the rear sleeve 221 clockwise until the two gears mesh with each other when a significant resistance is felt and rotation is impossible, at this time the output shaft of the motor is driven to rotate through the drive apparatus 23, thus driving the second gear 223 and the first gear 14 to rotate and implementing the automatic focusing; and when rotating anticlockwise and the locating pin 4 reaches the OFF indicating bit, the two gears are separated from each other, and at this time the telescope may be focused manually.

Figure 11:
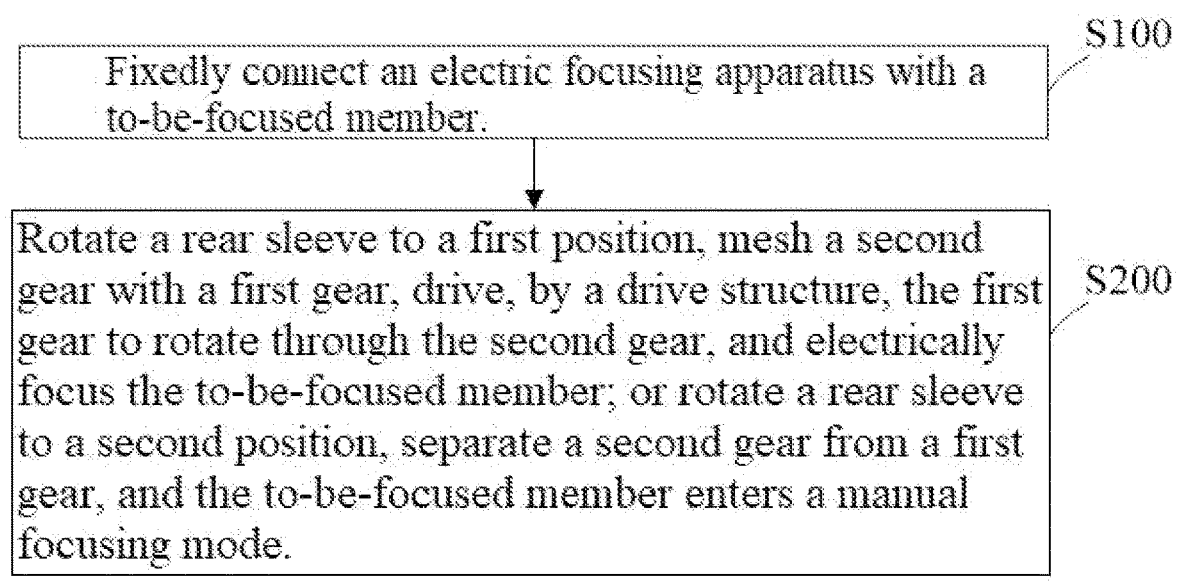
FIG. 11 is a flow diagram of a focusing method for telescope focusing provided by a typical embodiment of the present application.

As shown in FIG. 11, a focusing method for telescope focusing disclosed by the present application may include the following steps of:

S100, fixedly connecting the electric focusing apparatus 2 with the to-be-focused member 1; and S200, rotating the rear sleeve 221 to the first position 213, meshing the second gear 223 with the first gear 14, driving, by the drive structure 222, the first gear 14 to rotate through the second gear 223, and electrically focusing the to-be-focused member 1; or rotating the rear sleeve 221 to the second position 214, separating the second gear 223 from the first gear 14, and the to-be-focused member 1 entering a manual focusing mode.

The S200 specifically includes: rotating the rear sleeve 221, driving the locating pin 4 to slide along a direction that the sliding slot 212 is close to the first position 213, meanwhile driving the second gear 223 in the rear sleeve 221 to move along a direction close to the first gear 14, when the locating pin 4 slides to the first position 213 of the sliding slot 212, meshing the second gear 223 with the first gear 14, driving, by the drive structure 222 connected with the second gear 223, the second gear 223 to rotate, driving the first gear 14 to rotate while rotating, and performing electric focusing on the to-be-focused member 1; or, rotating the rear sleeve 221, driving the locating pin 4 to slide along a direction that the sliding slot 212 is close to the second position 214, meanwhile driving the second gear 223 in the rear sleeve 221 to move along a direction away from the first gear 14, when the locating pin 4 slides to the second position 214 of the sliding slot 212, separating the second gear 223 from the first gear 14, the to-be-focused member 1 entering a manual focusing mode. The specific process may also refer to the forgoing description for the focusing apparatus, and repetition is not made herein.

In the focusing apparatus for telescope focusing provided by embodiments of the present disclosure, the on-off limiting member and the rear sleeve are connected with each other to prevent the on-off limiting member separating from the rear sleeve, and the on-off limiting member and the rear sleeve can rotate in relative to each other, thus the two gears can reach two states of separating and meshing; meanwhile the positions of the on-off limiting member and the rear sleeve need to be stabilized when reaching the two states of separating and meshing, which requires a fixing mode, and this fixing mode cannot be complex, otherwise users are inconvenient to use. After repeated design, verification and optimization, the current solution is adopted, that is, the front end of the rear sleeve is embedded into the on-off limiting member, a slot is formed in the on-ff limiting member, a thread locating hole is formed in the front end of the rear sleeve, a locating pin is used, passes through the slot in the on-off limiting member and is screwed in the locating hole of the rear sleeve, thus the on-off limiting member is connected with the rear sleeve without separating from each other; meanwhile, the locating pin can move to different positions in the slot by rotating the rear sleeve, the rotating scope of the rear sleeve is defined simultaneously, and moreover the locating pin also plays a role in indicating two different states of separating and meshing in combination with the scales on both ends of the sliding slot in the on-off limiting member. Apparently, Reference 1 does not discloses such a technical solution, and this technical solution is also not known by those skilled in the art.

In the focusing apparatus for telescope focusing provided by embodiments of the present disclosure, an elastic damping member (such as a spring) is provided between the on-off limiting member and the rear sleeve, the elastic damping member increases the frictional force between the locating pin and the on-off limiting member, such that the on-off limiting member and the rear sleeve are ensured to be in a stable state when the on-off limiting member meshes with or is separated from the rear sleeve and the motor drives the gears to rotate, other locking modes are not required, that is, this is a self-locking mode, and when the rear sleeve rotates to any position, the gears may be stabilized at the corresponding position.

According to the focusing apparatus for telescope focusing provided by embodiments of the present disclosure, a threaded hole is also formed in the on-off limiting member, and the on-off limiting member and the rear sleeve may be fixed with the thumb screw, with the purpose of ensuring the stable state when the electric focusing is in the separating or meshing state for a long time.

Compared with a common lens or camera, an astronomical telescope usually has a longer focal length, so more accurate focusing is required, however idle running of the gears and other drive components will form return differences to affect the focusing precision, meanwhile the telescope model is various, which leads to fine differences of the relative positions of a bull gear and a pinion in the different installation combinations of the telescope and the electric focusing. If a switch and other fixing and limiting components are used for on-ff switch, the fine differences will lead to the great return difference in some combinations and the small return difference in some combinations, thus becoming unreliable and affecting the focusing precision; at the same time, different from the mode for on-off switch by using the switch and other fixing and limiting components, the mode of the sliding slot is adopted in the present disclosure to implement the on-off switch, when the gear meshing is required, the relative positions of the two gears may change from separating to approaching in a gentle and stepless manner, to reach an ideal meshing state and reduce the return difference caused by the gears, and therefore a stepless limiting mode is adopted in the present disclosure.

The focusing apparatus for telescope focusing provided by embodiments of the present application has the on-off structure, and the electric focusing apparatus may be disconnected with the to-be-focused member through the on-off structure, for ease of users' manual focusing. If the electric focusing is required, it only needs to connect the electric focusing apparatus with the to-be-focused member again through the on-off structure, which is very convenient to operate and easy to switch different focusing modes of the to-be-focused member.

The focusing apparatus for telescope focusing provided by embodiments of the present application has a wireless bluetooth function, and this apparatus may be connected and controlled through a mobile phone and other mobile devices for focusing, with convenient use; and the focusing apparatus provided by embodiments of the present application may be fixedly connected with the to-be-focused member through the hoop, and this installation mode is very convenient.

The focusing apparatus for telescope focusing provided by embodiments of the present application is also provided with an elastic damping member between the rear sleeve and the on-off limiting member, which is used for increasing a frictional force between a locating pin and a sliding slot of the on-off limiting member to prevent the on-off limiting member and the rear sleeve from loosening when the drive structure runs, thereby ensuring a focusing precision, and reducing a return difference during focusing.

The focusing apparatus for telescope focusing provided by embodiments of the present application also locks and fixes the rear sleeve and the on-off limiting member through the locking structure when the rear sleeve rotates to the first position, and maintaining the meshing state of the second gear and the first gear may ensure a meshing degree of the gears.

The focusing apparatus for telescope focusing provided by embodiments of the present application integrates the drive structure, the drive apparatus and the like in the rear sleeve, and the electric focusing apparatus is integrally set to a cylindrical shape, with a high level of integration, a small volume, concision, beautiful appearance and convenient installation and use.

Various aspects, embodiments, features and examples of the present application should be regarded as illustrative in all aspects and not intended to limit the present application, and the scope of the present application is only defined by claims. In a case of not deviating from the advocated spirit and scope of the present application, those skilled in the art will understand other embodiments, modifications and use.

Use of the title and chapters in the present application does not mean limiting the present application, and each chapter may be used for any aspect, embodiment or feature of the present application.

Unless specifically stated otherwise, the use of terms "include, includes, including)" and "have, has, having) should be usually understood as opening, and not restrictive.

It should be understood that the sequence of various steps or the sequence executing specific actions is not very important as long as the teaching of the present application maintains operable. In addition, two or above two steps or actions may be performed simultaneously.

Although the present application has been described with reference to the illustrative embodiments, those skilled in the art will understand that other various changes, omissions and/or additions may be made and the element of the embodiment may be replaced with substantial equivalent in a case of not deviating from the spirit and scope of the present application. In addition, a plurality of modifications may be made in a case of not deviating from the scope of the present application, making specific situations or materials adapt to the teaching of the present application. Therefore, the present application is not intended to be limited to execute the specific embodiments disclosed by the present application herein, instead of making the present application include all embodiments belonging to the scope of the appended claims.

What is claimed is:

1. An apparatus for a telescope, comprising:
a first member, which comprises a first gear; and
an electric apparatus, which comprises:
an on-off limiting member fixedly connected with the first member,
a drive fixation apparatus, which comprises a rear sleeve, a drive structure and a second gear, wherein the rear sleeve is connected with the on-off limiting member through a limiting assembly, the drive structure is fixed in the rear sleeve and connected with the second gear, the second gear and the first gear are eccentrically arranged, and under a limiting action of the limiting assembly, the rear sleeve rotates, in relative to the on-off limiting member, between a first position and a second position on the on-off limiting member; the limiting assembly comprises a sliding slot and a locating pin fitting with the sliding slot, the sliding slot is formed in the on-off limiting member and extends circumferentially along a center of the on-off limiting member, and two tail ends of the sliding slot are separately formed with the first position and the second position; and the locating pin is limited in the sliding slot and fixedly connected with the rear sleeve, and an elastic damping member for increasing a frictional force between the locating pin and the on-off limiting member is also arranged between a front end face of the rear sleeve and a front end face of the on-off limiting member; and
wherein the rear sleeve is configured to rotate to the first position such that the second gear meshes with the first gear, the drive structure drives the first gear to rotate through the second gear, the first member is in electric mode, and the rear sleeve is also locked and fixed to the on-off limiting member through a locking structure, to maintain a meshing state of the second gear and the first gear; and wherein the rear sleeve is configured to rotate to the second position such that the second gear is separated from the first gear, and the first member enters a manual mode.

2. The apparatus according to claim 1, wherein an outer side of the rear sleeve is formed with a blocking step and a fixing hole, and wherein an end face of the on-off limiting member is propped with the blocking step such that the fixing hole is located below the sliding slot, and the locating pin passes through the sliding slot and is locked in the fixing hole.

3. The apparatus according to claim 1, wherein the apparatus further comprises a drive apparatus electrically connected with the drive structure, the drive apparatus is arranged in the rear sleeve and comprises one or more integrated circuit boards, each circuit board comprises a motor drive chip, a main control chip and an USB (Universal Serial Bus) socket, the motor drive chip is electrically connected with the drive structure, and the main control chip is connected with both the motor drive chip and the USB socket.

4. The apparatus according to claim 3, wherein the circuit board further comprises a bluetooth module, and the main control chip is connected with the bluetooth module.

5. The apparatus according to claim 1, wherein the electric apparatus is fixedly connected with the first member through a hoop.

6. A method, wherein the method is implemented based on the apparatus according to claim 1, the limiting assembly comprises the sliding slot and the locating pin fitting with the sliding slot, the sliding slot is formed in the on-off limiting member and extends circumferentially along the center of the on-off limiting member, and two tail ends of the sliding slot are separately formed with the first position and the second position; and the locating pin is limited in the sliding slot and fixedly connected with the rear sleeve, and the method comprises:
   S100, fixedly connecting the electric apparatus with the first member; and
   S200, rotating the rear sleeve, driving the locating pin to slide along a direction that the sliding slot is close to the first position, meanwhile driving the second gear in the rear sleeve to move along a direction close to the first gear, wherein in response to the locating pin sliding to the first position of the sliding slot, meshing the second gear with the first gear, driving, by a drive structure connected with the second gear, the second gear to rotate, and driving the first gear to rotate while rotating;
   or, rotating the rear sleeve, driving the locating pin to slide along a direction that the sliding slot is close to the second position, meanwhile driving the second gear in the rear sleeve to move along a direction away from the first gear, wherein in response to the locating pin sliding to the second position of the sliding slot, separating the second gear from the first gear, the first member entering a manual mode, rotating the rear sleeve to the first position, meshing the second gear with the first gear, driving, by a drive structure, the first gear to rotate through the second gear, and the first member entering an electric mode;
   or rotating the rear sleeve to the second position, separating a second gear from the first gear, and the first member entering a manual mode.

7. The method according to claim 6, wherein the S100 further comprises:
   fixedly connecting the electric apparatus with a hoop;
   holding the hoop on the first member; and
   locking the hoop, and fixedly connecting the electric apparatus with the first member.

8. The method according to claim 6, wherein an outer side of the rear sleeve is formed with a blocking step and a fixing hole, wherein an end face of the on-off limiting member is propped with the blocking step such that the fixing hole is located below the sliding slot, and the locating pin passes through the sliding slot and is locked in the fixing hole.

9. The method according to claim 6, wherein the apparatus further comprises a drive apparatus electrically connected with the drive structure, the drive apparatus is arranged in the rear sleeve and comprises one or more integrated circuit boards, each circuit board comprises a motor drive chip, a main control chip and an USB (Universal Serial Bus) socket, the motor drive chip is electrically connected with the drive structure, and the main control chip is connected with both the motor drive chip and the USB socket.

10. The method according to claim 9, wherein the circuit board further comprises a bluetooth module, and the main control chip is connected with the bluetooth module.

11. The method according to claim 6, wherein the electric apparatus is fixedly connected with the first member through a hoop.

\* \* \* \* \*